(12) United States Patent
Siomina

(10) Patent No.: US 11,343,695 B2
(45) Date of Patent: May 24, 2022

(54) METHODS FOR QUALITY-AWARE REPORTING OF RSSI-BASED MEASUREMENTS TO AVOID RSSI WINDOW SPLIT

(71) Applicant: Telefonaktiebolaget LM Ericsson (publ), Stockholm (SE)

(72) Inventor: Iana Siomina, Täby (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 23 days.

(21) Appl. No.: 16/076,266

(22) PCT Filed: Feb. 8, 2017

(86) PCT No.: PCT/EP2017/052771
§ 371 (c)(1),
(2) Date: Aug. 7, 2018

(87) PCT Pub. No.: WO2017/137445
PCT Pub. Date: Aug. 17, 2017

(65) Prior Publication Data
US 2020/0351688 A1    Nov. 5, 2020

Related U.S. Application Data

(60) Provisional application No. 62/292,514, filed on Feb. 8, 2016.

(51) Int. Cl.
*H04B 17/318* (2015.01)
*H04B 17/373* (2015.01)
(Continued)

(52) U.S. Cl.
CPC .......... *H04W 24/10* (2013.01); *H04B 17/318* (2015.01); *H04B 17/373* (2015.01);
(Continued)

(58) Field of Classification Search
CPC ......... H04B 17/0082–409; H04L 5/003–0098; H04W 16/14–16; H04W 24/02–10;
(Continued)

(56) References Cited

U.S. PATENT DOCUMENTS

2014/0256347 A1  9/2014 Lakhzouri et al.
2015/0188599 A1  7/2015 Shi et al.
(Continued)

FOREIGN PATENT DOCUMENTS

CN   101296470 A   10/2008
CN   101518128 A   8/2009
(Continued)

OTHER PUBLICATIONS

3GPP, "3rd Generation Partnership Project; Technical Specification Group Radio Access Network; Evolved Universal Terrestrial Radio Access (E-UTRA); Physical channels and modulation (Release 13)", 3GPP TS 36.211 V13.0.0, Dec. 2015, 1-141.
(Continued)

*Primary Examiner* — Timothy J Weidner
(74) *Attorney, Agent, or Firm* — Murphy, Bilak & Homiller, PLLC

(57) ABSTRACT

According to an aspect, a network node serving a wireless device obtains a quality requirement for a wireless device measurement that is based on RSSI measurement samples and determines configuration parameters for the wireless device based on the quality requirement. The network node sends the determined configuration parameters to the wireless device. The wireless device obtains a set of the configuration parameters for RSSI measurements. The configuration parameters specify a length for RSSI measurement durations in which RSSI measurement samples are obtained and an RSSI measurement periodicity for the RSSI measurement durations. The wireless device adapts operation of
(Continued)

the UE with respect to the measurement that is based on RSSI measurement samples, based on a quality requirement for the measurement that is based on RSSI measurement samples.

16 Claims, 8 Drawing Sheets

(51) Int. Cl.
  *H04W 24/08* (2009.01)
  *H04W 24/10* (2009.01)
  *H04W 72/04* (2009.01)
  *H04W 72/08* (2009.01)
  *H04W 88/02* (2009.01)
  *H04W 88/08* (2009.01)
  *H04W 92/10* (2009.01)

(52) U.S. Cl.
  CPC ......... *H04W 24/08* (2013.01); *H04W 72/042* (2013.01); *H04W 72/08* (2013.01); *H04W 88/02* (2013.01); *H04W 88/08* (2013.01); *H04W 92/10* (2013.01)

(58) Field of Classification Search
  CPC ......... H04W 36/0005–385; H04W 72/002–14; H04W 88/02; H04W 88/04–10; H04W 92/04; H04W 92/10
  See application file for complete search history.

(56) References Cited

U.S. PATENT DOCUMENTS

| | | | |
|---|---|---|---|
| 2015/0289141 A1 | 10/2015 | Ghasemzadeh et al. | |
| 2018/0220458 A1* | 8/2018 | Ouchi ................... | H04W 72/04 |
| 2018/0241487 A1* | 8/2018 | Li ......................... | H04W 16/14 |

FOREIGN PATENT DOCUMENTS

| | | |
|---|---|---|
| CN | 102149126 A | 8/2011 |
| CN | 102725649 A | 10/2012 |
| CN | 103200589 A | 7/2013 |
| EP | 2547012 A1 | 1/2013 |
| WO | 2017137445 A1 | 8/2017 |

OTHER PUBLICATIONS

3GPP, "3rd Generation Partnership Project; Technical Specification Group Radio Access Network; Evolved Universal Terrestrial Radio Access (E-UTRA); Physical layer; Measurements (Release 13)", 3GPP TS 36.214 V13.0.0, Dec. 2015, 1-18.

3GPP, "3rd Generation Partnership Project; Technical Specification Group Radio Access Network; Evolved Universal Terrestrial Radio Access (E-UTRA); Radio Resource Control (RRC); Protocol specification (Release 13)", 3GPP TS 36.331 V13.0.0, Dec. 2015, 1-507.

3GPP, "3rd Generation Partnership Project; Technical Specification Group Radio Access Network; Evolved Universal Terrestrial Radio Access (E-UTRA); Requirements for support of radio resource management (Release 13)", 3GPP TS 36.133 V13.0.0, Jul. 2015, 1-1412.

Unknown, Author, "Considerations on RSSI Measurements for LAA", 3GPP TSG-RAN WG2 #92, R2-156715, Anaheim, USA, Nov. 16-20, 2015, 1-4.

Unknown, Author, "On LAA RSSI measurement", 3GPP TSG RAN WG1 Meeting #83, R1-157143, Anaheim, USA, Nov. 15-22, 2015, 1-3.

Unknown, Author, "Remaining Details of RRM Measurements and Reporting for LAA", 3GPP TSG RAN WG1 Meeting #83, R1-157262, Anaheim, USA, Nov. 16-20, 2015, 1-4.

* cited by examiner

METHODS FOR QUALITY-AWARE REPORTING OF RSSI-BASED MEASUREMENTS TO AVOID RSSI WINDOW SPLIT

TECHNICAL FIELD

The present disclosure is generally related to wireless communications, and is more particularly related to techniques for adapting measurements based on Radio Signal Strength Indicator (RSSI) measurement samples in wireless devices.

BACKGROUND

Measurements with LAA

License assisted access (LAA), or operation based on frame structure type 3 is introduced in Release 13 of the specifications for Long-Term Evolution (LTE) wireless communications released by the $3^{rd}$-Generation Partnership Project (3GPP), and refers to user equipment (UE) operation on at least one carrier in non-licensed spectrum, such as Band 46, which also used for WiFi access. (Frame structure type 3 is specified in 3GPP TS 36.211, v13.0.0, January 2016.) With LAA, a UE can be configured, for example, to perform carrier aggregation with a primary cell (PCell) in Band 1, in licensed spectrum, and a secondary cell (SCell) in Band 46, which is unlicensed spectrum.

An eNB (3GPP terminology for a base station, or wireless access node) operating in the unlicensed band only transmits signals that may be used for UE measurements using so called discovery reference symbols (DRS). Unlike Release 8 common reference symbols (CRS), DRS are not transmitted in every subframe, and are instead transmitted periodically (e.g., every 160 milliseconds). Moreover, the eNB may perform so called listen-before-talk (LBT) procedures, before transmitting DRS, to check that no other unlicensed node (such as a WiFi access point) is already transmitting in the unlicensed spectrum. This means that, from a UE perspective, the eNB may be unable to transmit any particular DRS transmission. In certain regions, LBT functionality is required from a regulatory point of view to ensure fair coexistence of different radios and access technologies on the unlicensed band.

LAA measurements performed by UEs as specified by Release 13 of the LTE specifications include: CRS-based measurements (RSRP, RSRQ), CSI-based measurements (CSI-RSRP), UE RSSI, channel occupancy, cell detection, CSI, PMI, CQI.

RSSI (Received Signal Strength Indicator) in E-UTRA

There are three types of RSSI in E-UTRA: non-reportable RSSI used for RSRQ measurements, reportable UE RSSI used for LAA, and eNodeB RSSI used for LAA.

The UE-reportable RSSI used for LAA is specified in 3GPP 36.214, v13.0.0, as shown below in Table 1.

TABLE 1

| | |
|---|---|
| Definition | E-UTRA Received Signal Strength Indicator (RSSI), comprises the linear average of the total received power (in [W]) observed only in the configured OFDM symbols and in the measurement bandwidth over N number of resource blocks, by the UE from all sources, including co-channel serving and non-serving cells, adjacent channel interference, thermal noise etc. |
| | Higher layers indicate the measurement duration and which OFDM symbol(s) should be measured by the UE. |
| | The reference point for the RSSI shall be the antenna connector of the UE. |
| | If receiver diversity is in use by the UE, the reported value shall not be lower than the corresponding RSSI of any of the individual diversity branches |
| Applicable for | RRC_CONNECTED intra-frequency, RRC_CONNECTED inter-frequency |

According to 3GPP specifications, the UE physical layer shall be capable of performing such RSSI measurements on one or more carriers, if the carrier(s) are indicated by higher layers of the UE protocol stack, and reporting the RSSI measurements to higher layers. The UE physical layer shall provide to higher layers a single RSSI sample for each Orthogonal Frequency-Division Multiplexing (OFDM) symbol within each configured RSSI measurement duration, which occur with a configured RSSI measurement timing configuration periodicity. The UE can report RSSI in the range of −100 dBm to −25 dBm, with 1 dBm resolution, and can also report an indication when RSSI<−100 dBm or when RSSI>=−25 dBm.

For this RSSI, the L1 (physical layer) averaging duration is pre-defined, as one OFDM symbol. Further, this RSSI is configured by the following parameters (see also FIG. 1):

Periodicity of UE-reported RSSI measurement duration is configured with a value of 40, 80, 160, 320, 640 milliseconds.

Measurement duration of UE-reported RSSI measurement is configured as 1, 14, 28, 42, or 70, in units of L1 averaging duration.

Optionally, a configurable subframe offset for inter-frequency measurement is configured: when the parameter is configured, the UE measures according to the configured offset, and when the parameter is not configured the starting offset is chosen randomly by the UE.

FIG. 1 illustrates an example of the configuration for a UE-reportable RSSI measurement for LAA. In this example, the measurement duration is 70 milliseconds.

Channel Occupancy Measurement

The UE-reportable RSSI measurement is used for the channel occupancy measurement, which is a measure of the percentage of (per-symbol) samples for which the RSSI is above a configured channelOccupancyThreshold for the associated reportConfig.

The channel occupancy measurement is reported by the UE to eNodeB via RRC, together with the RSSI. As specified in 3GPP specifications:

```
MeasResultForRSSI-r13 ::=    SEQUENCE {
    rssi-Result-r13              RSSI-Range-r13,
    channelOccupancy-r13         INTEGER (0..100)
}
```

According to 3GPP TS 36.331, v13.0.0:

```
if the measRSSI-ReportConfig is configured within the corresponding reportConfig for this
measId:
    --> set the rssi-Result to the average of sample value(s) provided by lower layers in the
        reportInterval;
    ---> set the channelOccupancy to the rounded percentage of sample values which are
        beyond to the channelOccupancyThreshold within all the sample values in the
        reportInterval;
where:
ReportInterval ::= ENUMERATED {ms120, ms240, ms480, ms640, ms1024, ms2048, ms5120,
ms10240, min1, min6, min12, min30, min60, spare3, spare2, spare1}
```

SUMMARY

An example method according to several of the embodiments detailed herein is carried out by a UE or other wireless device, and includes obtaining a set of configuration parameters for RSSI measurements, the configuration parameters specifying a length for RSSI measurement durations in which RSSI measurement samples are obtained and an RSSI measurement periodicity for the RSSI measurement durations. The method also includes adapting operation of the wireless device with respect to the measurement that is based on RSSI measurement samples, based on a quality requirement for the measurement that is based on RSSI measurement samples. This adapting may include adapting one or more of: a reporting interval or reporting time for the measurement that is based on RSSI measurement samples, at least one RSSI configuration parameter from the obtained set of configuration parameters for the RSSI measurements, for performing the measurement that is based on RSSI measurement samples, and usage of the RSSI measurement samples for performing the measurement that is based on RSSI measurement samples. In some embodiments, the method further comprises obtaining the quality requirement for the measurement that is based on RSSI measurement samples.

An example method according to several other embodiments detailed herein is carried out in a network node operating in a wireless network and serving a wireless device, and includes determining one or more configuration parameters for the wireless device, based on a quality requirement for a wireless device measurement that is based on RSSI measurement samples, and sending the determined configuration parameters to the wireless device. The configuration parameters relate to one or more of: a reporting interval for the wireless device measurement, a length for RSSI measurement durations in which RSSI measurement samples are obtained, an RSSI measurement periodicity for the RSSI measurement durations, a time offset for the RSSI duration windows, and a condition or configuration for controlling reporting of the wireless device measurement. In some embodiments, the method further comprises obtaining the quality requirement for the measurement that is based on RSSI measurement samples.

Embodiments include apparatuses configured to carry out one or more of the methods detailed herein, and/or variations thereof. An example wireless device comprises processing circuitry configured (or operable) to perform the wireless device-related method summarized above. The processing circuitry may be operatively associated with a communication interface circuit and/or transceiver circuitry. The processing circuitry may comprise, for example, one or more digital processors, e.g. one or more microprocessors, microcontrollers, Digital Signal Processors (DSPs), Field Programmable Gate Arrays (FPGAs), Complex Programmable Logic Devices (CPLDs), Application Specific Integrated Circuits (ASICs) or any combination thereof. The processing circuitry may also include a memory. The memory may in some embodiments comprise one or more computer programs.

Similarly, other embodiments include network nodes configured to perform one or more of the methods detailed herein, and/or variations thereof. An example network node may comprise processing circuitry configured (or operable) to perform the network node-related method summarized above. The processing circuitry may be operatively associated with a communication interface circuit 38 and/or transceiver circuitry. The processing circuitry may comprise, for example, one or more digital processors, e.g. one or more microprocessors, microcontrollers, DSPs, FPGAs, CPLDs, ASICs or any combination thereof. The processing circuitry may also include a memory. The memory may in some embodiments comprise one or more computer programs.

Additional embodiments and further details and advantages of the inventive techniques and apparatus disclosed herein are described below.

DETAILED DESCRIPTION

At least the following problems may be envisioned with the specification of RSSI-related measurements for LAA, as of Release 13 of the 3GPP specifications:

The measurement time for RSSI and channel occupancy is the report interval (because the UE will have to use the RSSI samples reported by then by the physical layer which reports every symbol), which is, however, independently configured from the RSSI periodicity and which is also not a multiple of RSSI duration, which may result in poor-quality RSSI and channel occupancy measurement reports.

The problem becomes even worse for inter-frequency RSSI and channel occupancy, when the offset of DRS occasion can be randomly selected by the UE.

The report interval boundary may fall in the middle of the RSSI window (e.g., which has 14 symbols duration), which may result in that the channel occupancy will be reported for the X samples within the RSSI window before the reporting point and the remaining (14-X) samples will be used for evaluating channel occupancy in the next reporting interval and there may be no other samples until the next reporting point. If X=1, then the channel occupancy measurement may be wrong by 100% due to insufficient number of samples, e.g., as shown in FIG. 2, where the problem occurs for the second RSSI window which becomes split by the reporting point.

Figure 1:
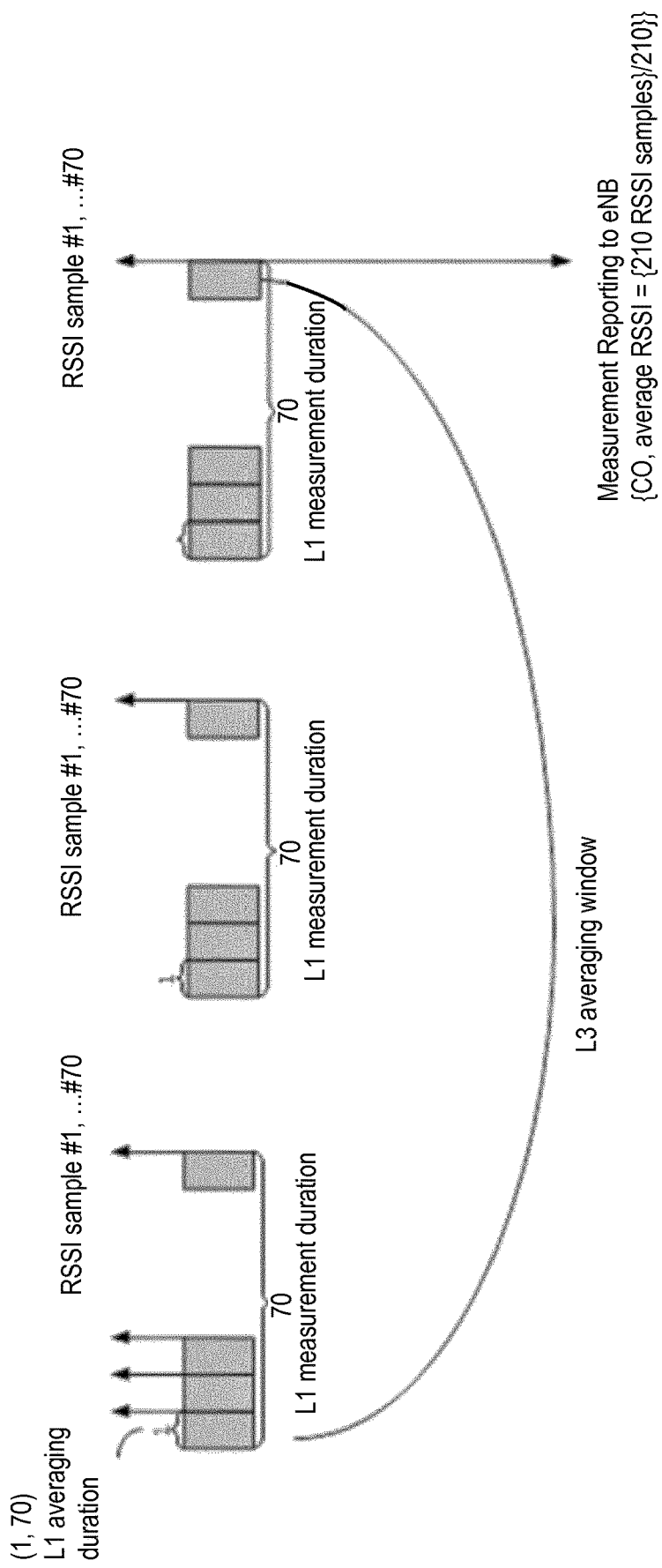
FIG. 1 illustrates an example configuration of UE-reportable RSSI measurements for LAA, with an RSSI measurement duration of 70 milliseconds.
Figure 2:
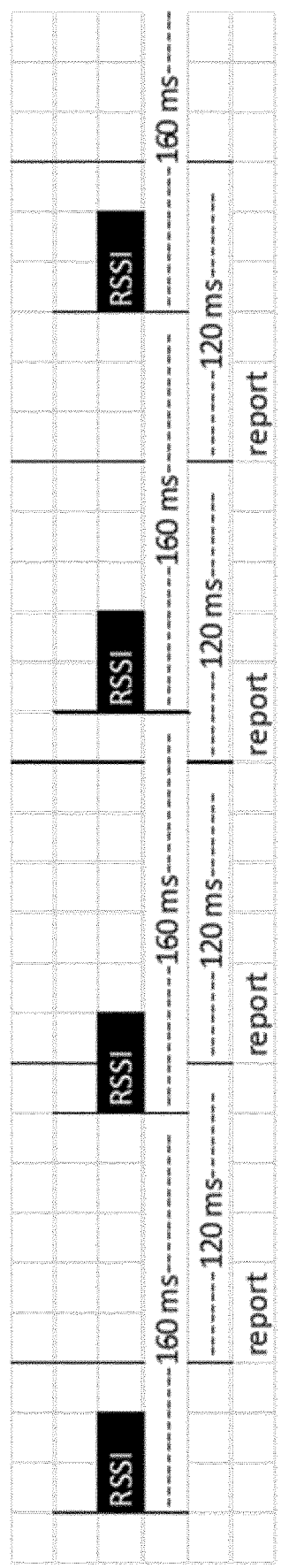
FIG. 2 illustrates an example of misalignment between RSSI measurement durations and reporting intervals.

FIG. 2 illustrates a possible issue with misalignment between the reporting interval and the RSSI measurement duration, or "RSSI window." As seen in the figure, the RSSI window occurs at the beginning of each RSSI measurement period, which in the illustrated example has a periodicity of 160 milliseconds. The reporting interval in this example, on the other hand, is configured to be 120 milliseconds. Thus, the alignment between the RSSI measurement period and the reporting interval changes over time. As seen in the figure, this can result in the RSSI window being split by two reporting intervals, such that some of the RSSI measurement samples in the window fall in one reporting interval, and some fall in another.

Embodiments of the present invention aim to overcome or mitigate at least some of these problems.

Embodiments of the present invention will now be described.

Methods in a UE or other wireless device, according to some embodiments of the presently disclosed techniques, may comprise the steps of:
  Step 1: Obtaining a first set of RSSI configuration parameters, comprising RSSI duration and RSSI periodicity.
  Step 2: Obtaining a quality metric associated with RSSI.
  Step 3: Adapting (or determining) one or more of:
    a reporting interval for at least one measurement which is to be based on RSSI samples,
    at least one RSSI configuration parameter from the first set of RSSI configuration parameters and/or from a second set of RSSI configuration parameters (and/or at least one further RSSI configuration parameter), and
    UE behavior in handling (or UE processing of) (available) RSSI samples, based at least on the first set of RSSI configuration parameters obtained in Step 1 and the quality metric.
  Step 4: Perform at least one measurement based on the adapted/determined configuration of the reporting interval and/or RSSI configuration parameter(s) (and/or UE processing of the (available) RSSI samples).
  Step 5 (optional): Using the at least one measurement for operational tasks and/or reporting a result of the at least one measurement to another node.

The measurement may be, for example, a channel occupancy measurement.

In another example, methods in a network node may comprise the steps of:
  Step 1: Obtaining a quality metric associated with RSSI.
  Step 2: Based on the quality metric, adaptively determine (or determine or choose) one or more parameters of: a reporting interval for at least one measurement which is to be based on RSSI samples, RSSI duration, RSSI periodicity, a time offset for the RSSI duration window.
  Step 3: Send the at least one determined parameter to least one UE to control reporting of a measurement based on RSSI samples Again, the measurement may be, for example, a channel occupancy measurement.

Embodiments of the present invention may provide the following advantages:
  The possibility to avoid or reduce quality degradation for measurements based on RSSI samples;
  The possibility to perform measurements based on RSSI while meeting a pre-defined requirement and ensure the measurement quality.

Any two or more embodiments described in this document may be combined in any way with each other. Furthermore, even though the examples herein are given in the LAA context, the embodiments described herein are not limited to LAA and can also apply in a more general case when the UE may need to configure measurement period adaptively to one or more conditions, e.g., channel quality, Ês/Iot, SINR, received signal quality, total interference or interference on a specific resources or from a specific interferer(s), etc. Other non-limiting examples where the method is particularly beneficial include measurements for discontinuous receive (DRX) or extended DRX, and measurements in high speed train environments.

In the description of some embodiments herein, the term "UE" is used. The term "UE" as used herein refers to any type of wireless device capable of communicating with network node or another UE over radio signals. Such a wireless device might also be referred to, in various contexts, as a radio communication device, a target device, a device-to-device (D2D) UE, a machine-type UE or UE capable of machine-to-machine (M2M) communication, a sensor equipped with UE, a wireless-equipped iPAD or Tablet, a mobile terminal, a smart phone, a laptop-embedded-equipped (LEE), a laptop-mounted equipment (LME), a wireless USB dongle, or a Customer Premises Equipment (CPE). The term "UE" as used herein is thus meant to encompass all of these devices adapted for communicating with a wireless network node or other UE using radio signals.

In the description of some embodiment herein, the generic terminology "network node" is used. This refers to any kind of node in the radio access network, core network, or data network portions of a communication network, and may refer to a radio network node such as base station, radio base station, base transceiver station, base station controller, network controller, evolved Node B (eNB), Node B, Multi-cell/multicast Coordination Entity (MCE), relay node, access point, radio access point, Remote Radio Unit (RRU) Remote Radio Head (RRH), a core network node (e.g., MME, SON node, a coordinating node, positioning node, MDT node, etc.), or even an external node (e.g., $3^{rd}$ party node, a node external to the current network), etc. The "network node" may comprise one or more modules, distributed or integrated to any degree.

The term "radio node" as used herein may be used to denote a UE or a radio network node.

The embodiments described herein are applicable to single-carrier as well as to multicarrier or carrier aggregation (CA) operation of the UE, in which the UE is able to receive and/or transmit data to more than one serving cells. The term carrier aggregation (CA) is also called (e.g., interchangeably called) "multi-carrier system", "multi-cell operation", "multi-carrier operation", "multi-carrier" transmission and/or reception. In CA, one of the component carriers (CCs) is the primary component carrier (PCC) or simply the primary carrier or anchor carrier. The remaining ones are called secondary component carriers (SCCs) or simply secondary carriers or supplementary carriers. The serving cell is interchangeably referred to as the primary cell (PCell) or the primary serving cell (PSC). Similarly, a secondary serving cell is interchangeably referred to as a secondary cell (SCell) or secondary serving cell (SSC).

The term "signaling" as used herein may comprise any of: high-layer signaling (e.g., via RRC), lower-layer signaling (e.g., via a physical control channel or a broadcast channel), or a combination thereof. The signaling may be implicit or explicit. The signaling may further be unicast, multicast or broadcast. The signaling may also be directly to another node or via a third node.

The term "conditions" used herein in general refers to radio conditions. The radio conditions may be described e.g. by any one or more of: presence or absence (e.g., due to muting or LBT) of a certain signal or transmissions of a certain type or from a certain node, channel quality, Ês/Iot (e.g., as defined in 3GPP TS 36.133, v.13.0.0, where: Ês is the received energy per RE, power normalized to the sub-carrier spacing, during the useful part of the symbol, i.e. excluding the cyclic prefix, at the UE antenna connector; Iot is the received power spectral density of the total noise and interference for a certain RE, power integrated over the RE and normalized to the subcarrier spacing, as measured at the UE antenna connector), signal-to-interference-plus-noise ratio (SINR), signal-to-interference ratio (SIR), signal-to-noise ratio (SNR), received signal quality, received signal strength, total interference or interference on specific time and/or frequency resources or from a specific interferer(s), RSRP, RSRQ, CSI-RSRP. An example of radio conditions corresponding to two different measurement periods: Es/Iot>=threshold1 and threshold1>Es/Iot>=threshold2.

The term DRS or discover (or discovery) reference signal may comprise of any type of reference signal that can be used by the UE for performing one or more measurements. Examples of DRS are CRS, CSI-RS, PSS, SSS, MBSFN RS, etc. One or more DRS may be transmitted in the same DRS time resource. Examples of a DRS time resource are symbol, subframe, slot, etc.

The term "measurement" herein refers to radio measurements. Some examples of radio measurements are: RSSI measurement, channel occupancy measurement, WiFi RSSI measurement, signal strength or signal power measurements (e.g., RSRP or CSI-RSRP), signal quality measurements (e.g., RSRQ, SINR), timing measurements (e.g., Rx-Tx, RSTD, RTT, TOA), radio link monitoring measurements (RLM), CSI, PMI, cell detection, cell identification, number of successful reports, number of ACKs/NACKs, failure rate, error rate, etc. The measurements may be absolute or relative (e.g., absolute RSRP and relative RSRP). The measurements may be performed for one or more different purpose, e.g., RRM, SON, positioning, MDT, etc. The measurements may be, e.g., intra-frequency measurements, inter-frequency measurements, or CA measurements. The measurements may be performed in the licensed and/or unlicensed spectrum.

The term "measurement requirement" used herein may comprise a requirement for any one or more measurements (see the term "measurement"), e.g., maximum measurement time, minimum measurement accuracy, the amount of allowed interruptions, maximum reporting time, number of measured cells, etc.

Methods in a UE

Methods in a UE according to one or more of the techniques disclosed herein may comprise the steps of:
  Step 1: Obtaining a first set of RSSI configuration parameters, comprising RSSI duration and RSSI periodicity (or at least one RSSI configuration parameter).
  Step 2: Obtaining a quality metric associated with RSSI.
  Step 3: Adapting (or determining) one or more of:
    a reporting interval for at least one measurement which is to be based on RSSI samples,
    at least one RSSI configuration parameter from the first set of RSSI configuration parameters and/or from a second set of RSSI configuration parameters (or a further RSSI configuration parameter), and
    UE behavior in handling (or UE processing of) the available RSSI samples, based at least on the first set of RSSI configuration parameter (or at least one RSSI configuration parameter) obtained in Step 1 and the quality metric.
  Step 4: Perform at least one measurement based on the adapted (or determined) configuration of the reporting interval and/or RSSI configuration parameter(s) and/or UE processing of the available RSSI samples.
  Step 5 (optional): Using the at least one measurement for operational tasks and/or reporting a result of the at least one measurement to another node.

These steps are described in further detail, below.

Step 1

According to this step, the UE may obtain a first set of RSSI configuration parameters, comprising RSSI duration and RSSI periodicity. The RSSI configuration parameters may be UE-specific, cell-specific, area-specific, etc.

The obtaining may comprise any one or more of: using pre-defined, default or pre-configured parameters, receiving from another node (e.g., via the serving cell or reading the broadcast information of a cell), obtaining based on history (e.g., last used), autonomously determining based on measurements.

Step 2

In this step, the UE is obtaining a quality metric associated with RSSI. The quality metric may also be associated with the/a measurement which is to be based on RSSI samples. The measurement may have a reporting interval. Examples of the quality metric are: minimum number of RSSI samples for the measurement, minimum number of RSSI samples meeting a certain condition, minimum portion of the configured RSSI window that needs to be used for the measurement to be reported, a requirement that all RSSI samples from the same RSSI duration window are used within a single reporting interval, a requirement that all symbols in the RSSI duration window are available for the measurement within the same reporting interval, etc. It will be appreciated that each of these examples of a quality metric is a requirement applicable to the measurement; thus, the quality metric may be alternatively referred to as a "quality requirement."

The quality metric or quality requirement may be, e.g., one or more of: pre-defined, determined based on a pre-defined rule, dynamically obtained, reading from memory, obtaining from history, receiving from another node, obtained as a function of at least one RSSI configuration parameter, obtained by selecting from a table or by mapping from at least one RSSI configuration parameter, etc.

Step 3

According to this step, the UE is adapting (or determining) one or more of:

- a reporting interval for at least one measurement which is to be based on RSSI samples,
- at least one RSSI configuration parameter from the first set of RSSI configuration parameters and/or from a second set of RSSI configuration parameters (or at least one further RSSI configuration parameter), and
- UE behavior in handling (or UE processing of) the available RSSI samples, based at least on the first set of RSSI configuration parameters (or the at least one RSSI configuration parameter) obtained in Step 1 and the quality metric (and optionally based on a reporting interval for at least one measurement which is to be based on RSSI samples).

The reporting interval configuration may or may not be RSSI-specific, e.g., it can be for a set of measurements on a specific carrier frequency or for a set of measurements for a certain cell Some examples of the adaptation (or determination):

- UE adapts (or determines) the reporting interval to satisfy the quality metric, e.g., the UE may change or determine the length of the reporting interval, e.g. extend or shorten the reporting interval, to ensure that all or a certain minimum number of RSSI samples from the same RSSI window are obtained within the same reporting interval (or a single reporting interval)
- Apply (including for example determining or choosing) a time offset to the RSSI window to shift it in time to ensure that all or a certain minimum number of RSSI samples from the same RSSI window are obtained within the same reporting interval
- Adaptively selecting (instead of fully randomly choosing) the time offset for inter-frequency RSSI so that the quality metric can be satisfied
- Adapt, change or determine e.g. extend or shorten the duration of the RSSI window to fit into the reporting interval, for example if the quality metric is satisfied
- Adapt the RSSI sampling periodicity to satisfy the quality metric
- UE adapts (or determines or chooses) a triggering condition or triggering event configuration to control the reporting so that the quality metric is met.
- Physical layer delays delivery of RSSI samples to higher layers unless the quality metric can be satisfied for all available RSSI samples from the same window
- UE does not use (e.g., drops in the end of each reporting interval) RSSI samples which do not satisfy the quality metric
- UE postpones the use of RSSI samples from non-full RSSI window until the next reporting interval, hereby extending the measurement time for the measurement based on the RSSI samples Step 4

According to this step, the UE performs at least one measurement based on the adapted (or determined) configuration of the reporting interval and/or RSSI configuration parameter(s) and/or UE behavior in handling the available RSSI samples. Some example measurements are RSSI measurement and channel occupancy measurement. The at least one measurement may be based on RSSI samples and have a reporting interval (for example distinct or different from a/the RSSI window). More examples are given below.

Step 5 (Optional)

According to this step, the UE may be using the at least one measurement for operational tasks (e.g., for autonomous operation, for positioning, autonomous RRM, etc.) and/or reporting a result of the at least one measurement to another node (e.g., a network node).

The UE may further send indication to another node whether the quality metric was or was not satisfied for all or some RSSI samples. The indication may also comprise a measurement failure cause when the quality metric was not satisfied.

Methods in a Network Node

Methods in a network node according to some embodiments of the presently disclosed techniques may comprise the steps of:

Step 1: Obtaining a quality metric associated with RSSI.

In this step, the network node is obtaining a quality metric associated with RSSI. The quality metric may also be associated with the/a measurement which is to be based on RSSI samples (wherein the measurement has a measurement period or reporting interval). Examples of the quality metric include: minimum number of RSSI samples for the measurement, minimum number of RSSI samples meeting a certain condition, minimum portion of the configured RSSI window that need to be used for the measurement to be reported, a requirement that all RSSI samples from the same RSSI duration window are used within a single reporting interval, a requirement that all symbols in the RSSI duration window are available for the measurement within the same reporting interval, etc. Once again, it will be appreciated that each of these examples is a requirement regarding the measurement; the quality metric may thus be alternatively referred to as a "quality requirement."

The quality metric or quality requirement may be, e.g., one or more of: pre-defined, determined based on a pre-defined rule, dynamically obtained, reading from memory, obtaining from history, receiving from another node, obtained as a function of at least one RSSI configuration parameter, obtained by selecting from a table or by mapping from at least one RSSI configuration parameter, etc.

Step 2: Based on the quality metric or quality requirement (and optionally on one or more RSSI configuration parameters, and/or a reporting interval for a measurement which is to be based on RSSI samples), adaptively determine (or determine or chose) one or more parameters of: a reporting interval for at least one measurement which is to be based on RSSI samples, RSSI duration, RSSI periodicity, a time offset for the RSSI duration window, a condition or configuration for controlling the measurement reporting.

The reporting interval configuration may or may not be RSSI-specific, e.g., it can be for a set of measurements on a specific carrier frequency or for a set of measurements for a certain cell The determining may be based on a pre-defined rule which targets meeting the quality metric, on a function, on a table, history. For multiple parameters to determine, the determining may be sequential or joint or based on a pre-defined rule.

Some examples are: determining a length of (e.g., extending or shortening) the reporting interval to satisfy the quality metric, e.g., to ensure that all or a certain minimum number of RSSI samples from the same RSSI window are obtained within the same reporting interval; configure a time offset for the RSSI window to shift it in time to ensure that all or a certain minimum number of RSSI samples from the same RSSI window are obtained within the same reporting interval; configure a time offset to the inter-frequency RSSI window to satisfy the quality metric; determine or adapt (e.g. extend or shorten) the duration of the RSSI window to fit into the reporting interval, if the quality metric is satisfied; adapt (or determine or configure) a triggering condition or triggering event configuration to control the reporting so that the quality metric is met.

Figure 3:
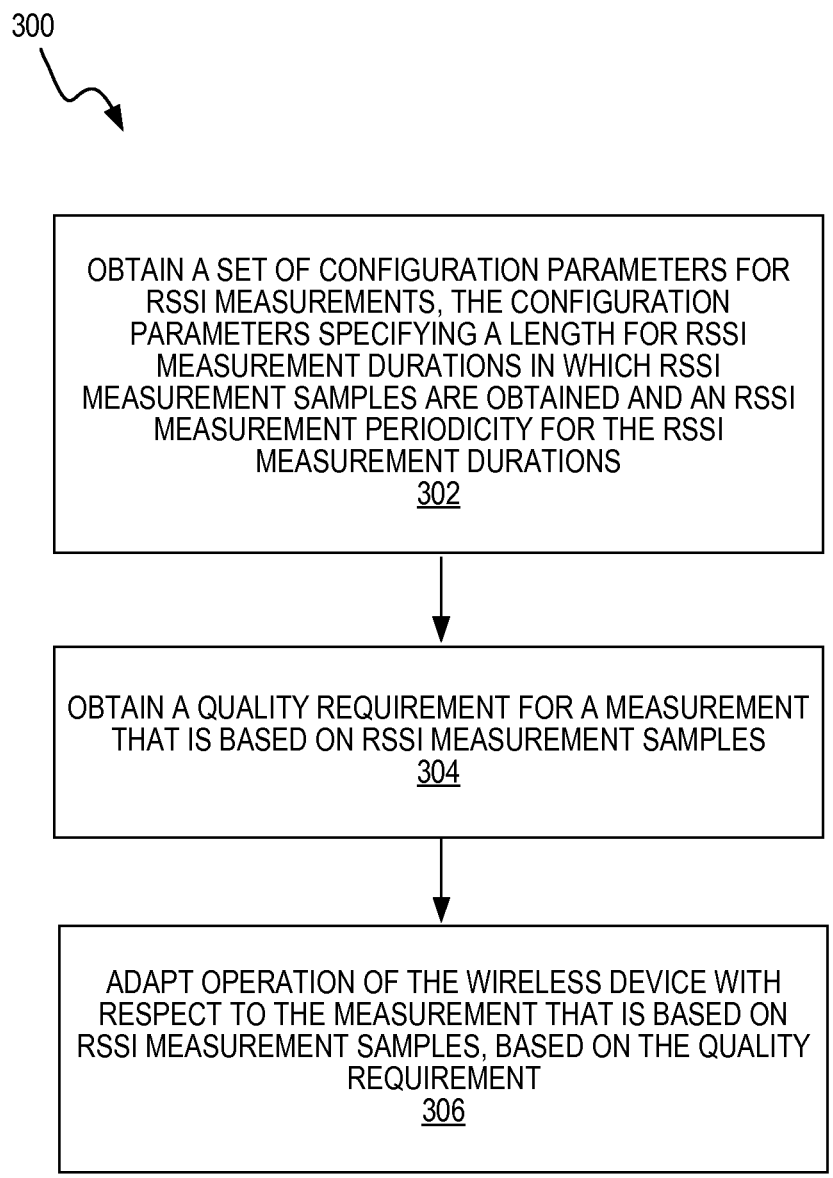
FIG. 3 is a process flow diagram illustrating an example method in a wireless device.

Step 3: Send (directly or indirectly) the at least one determined parameter to least one UE to control reporting of a measurement based on RSSI samples The sending may be via broadcast, multicast or unicast In view of the detailed description of techniques and examples provided above, it will be appreciated that FIG. 3 illustrates an example method 300 in a UE or other wireless device, in accordance with these techniques. The illustrated method includes obtaining a set of configuration parameters for RSSI measurements, the configuration parameters specifying a length for RSSI measurement durations in which RSSI measurement samples are obtained and an RSSI measurement periodicity for the RSSI measurement durations (block 302). The method 300 also includes obtaining a quality requirement for a measurement that is based on RSSI measurement samples (block 304) and adapting operation of the wireless device with respect to the measurement that is based on RSSI measurement samples, based on the quality requirement (block 306).

The adapting may include adapting one or more of: a reporting interval or reporting time for the measurement that is based on RSSI measurement samples, at least one RSSI configuration parameter from the obtained set of configuration parameters for the RSSI measurements, for performing the measurement that is based on RSSI measurement samples, and usage of the RSSI measurement samples for performing the measurement that is based on RSSI measurement samples.

In some cases, the adapting includes adapting a time offset to be applied to the intervals in which RSSI measurement samples are obtained, for performing the measurement that is based on RSSI measurement samples. Adapting the time offset may include selecting a time offset for inter-frequency RSSI measurements, based on the quality requirement.

The adapting may include adapting a triggering condition for reporting the measurement that is based on RSSI measurement samples, based on the quality requirement or changing the length of one or more RSSI measurement durations or the RSSI measurement periodicity, for performing the measurement that is based on RSSI measurement samples. The adapting may also include discarding one or more RSSI measurement samples, based on the quality requirement, or postponing a use of one or more RSSI measurements from a first measurement interval for the measurement that is based on RSSI measurements to a second measurement interval for the measurement that is based on RSSI measurement samples, based on the quality requirement.

The quality requirement may be one of the following: a minimum number of RSSI measurement samples for the measurement that is based on RSSI measurement samples; a minimum number of RSSI measurement samples meeting a predetermined condition, for the measurement that is based on RSSI measurement samples; a minimum portion of a given RSSI measurement duration that must be used for the measurement that is based on RSSI measurement samples; a requirement that all symbols in a given RSSI duration interval are available within the reporting interval for the measurement that is based on RSSI measurement samples; and a requirement that all symbols in a given RSSI duration interval within the reporting interval are used for the measurement that is based on RSSI measurement samples.

The method 300 may also include reporting a result of the measurement to a network node in the wireless communication network or sending, to a network node in the wireless communication network, an indication of whether the quality requirement was satisfied, for one or more instances of the measurement that is based on RSSI measurement samples. The measurement may be based on RSSI samples comprises at least one of a channel occupancy measurement and an RSSI measurement.

Figure 4:
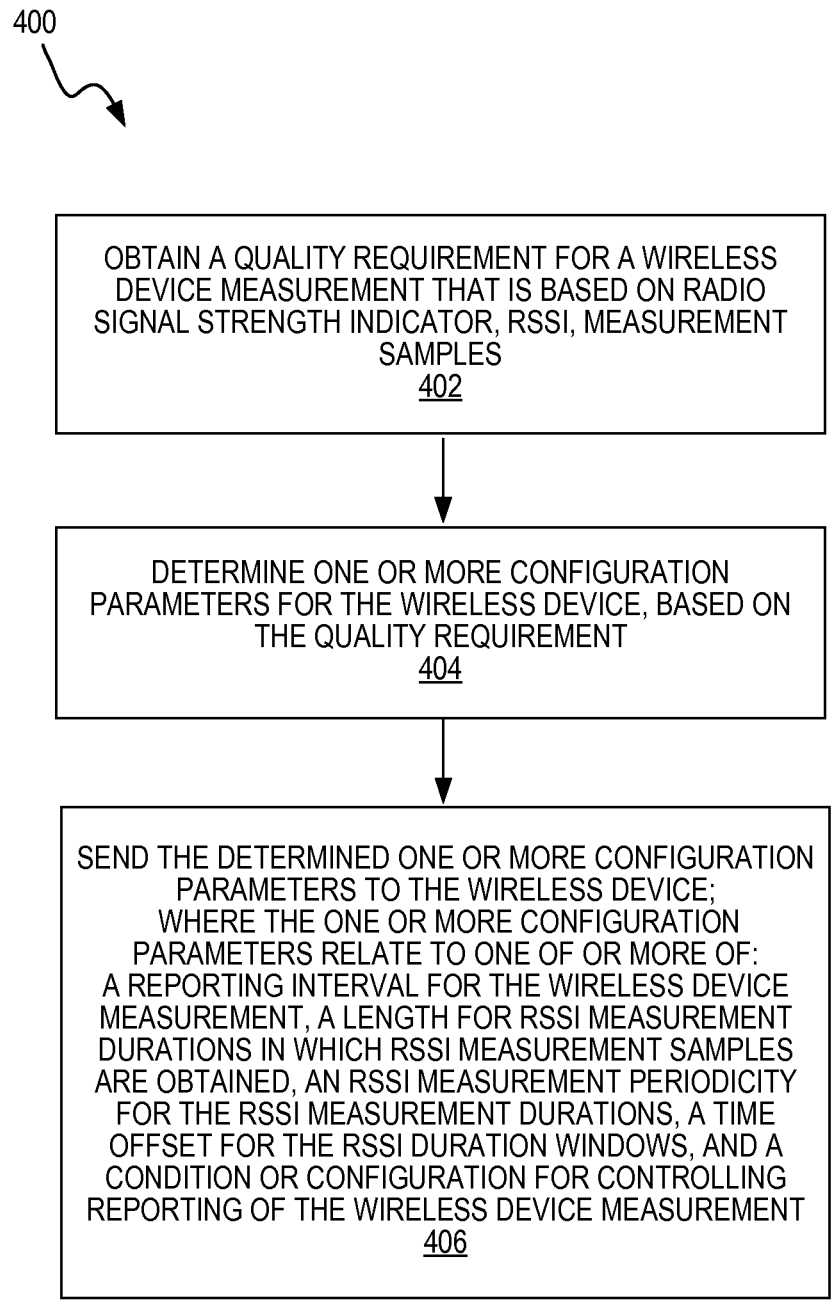
FIG. 4 is a process flow diagram illustrating an example method in a network node.

Similarly, it will be appreciated that FIG. 4 illustrates an example method 400 in a network node operating in a wireless network and serving a wireless device, where the method is in accordance with the techniques described above. The illustrated method 400 includes obtaining a quality requirement for a wireless device measurement that is based on RSSI measurement samples (block 402) and determining one or more configuration parameters for the wireless device, based on the quality requirement (block 404). The method 400 also includes sending the determined configuration parameters to the wireless device (block 406). The configuration parameters relate to one or more of: a reporting interval for the wireless device measurement, a length for RSSI measurement durations in which RSSI measurement samples are obtained, an RSSI measurement periodicity for the RSSI measurement durations, a time offset for the RSSI duration windows, and a condition or configuration for controlling reporting of the wireless device measurement.

Determining the configuration parameters may include determining a length of a reporting interval to ensure that all or a certain minimum number of RSSI measurement samples from within a RSSI measurement duration are obtained within the reporting interval. Determining the configuration parameters may also include determining a time offset for the RSSI measurement durations, so as to shift the RSSI measurement durations to ensure that all or a certain minimum number of RSSI measurement samples from within a RSSI measurement duration are obtained within a reporting interval. Determining the configuration parameters may further include determining the length for RSSI measurement durations, so as to fit within a reporting interval.

Figure 5:
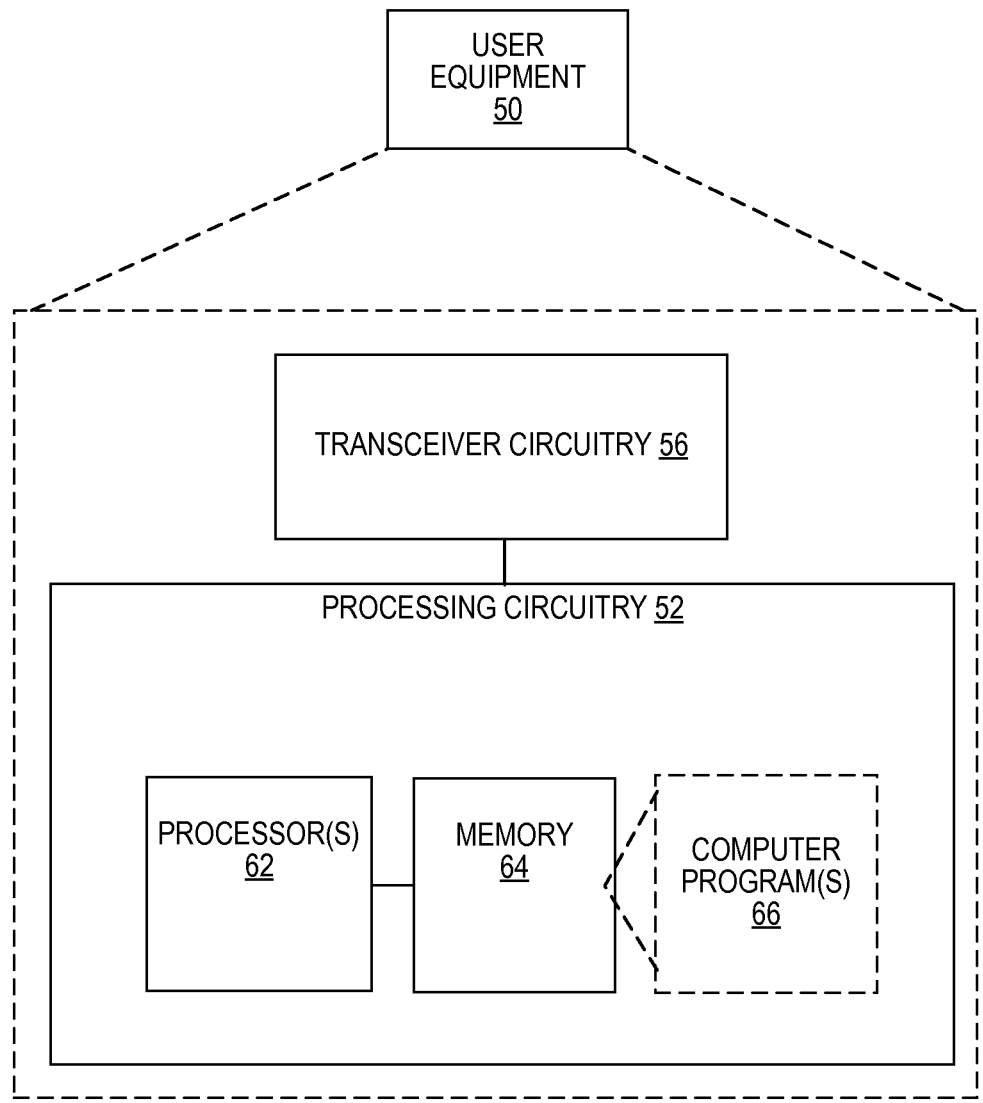
FIG. 5 is a block diagram of an example wireless device.

FIG. 5 illustrates an example wireless device 50, such as a User Equipment (UE), that may be configured to perform any of the methods described above as suitable for a wireless device. For example, the UE 50 may comprise processing circuitry 52 configured (or operable) to perform any of the methods described above, such as method 300. The processing circuitry 52 may be operatively associated with a communication interface circuit and/or transceiver circuitry 56. The processing circuitry may comprise, for example, one or more digital processors 62, e.g. one or more microprocessors, microcontrollers, Digital Signal Processors (DSPs), Field Programmable Gate Arrays (FPGAs), Complex Programmable Logic Devices (CPLDs), Application Specific Integrated Circuits (ASICs) or any combination thereof. The processing circuitry 52 may also include a memory 64. The memory 64 may in some embodiments comprise one or more computer programs 66.

Figure 7:
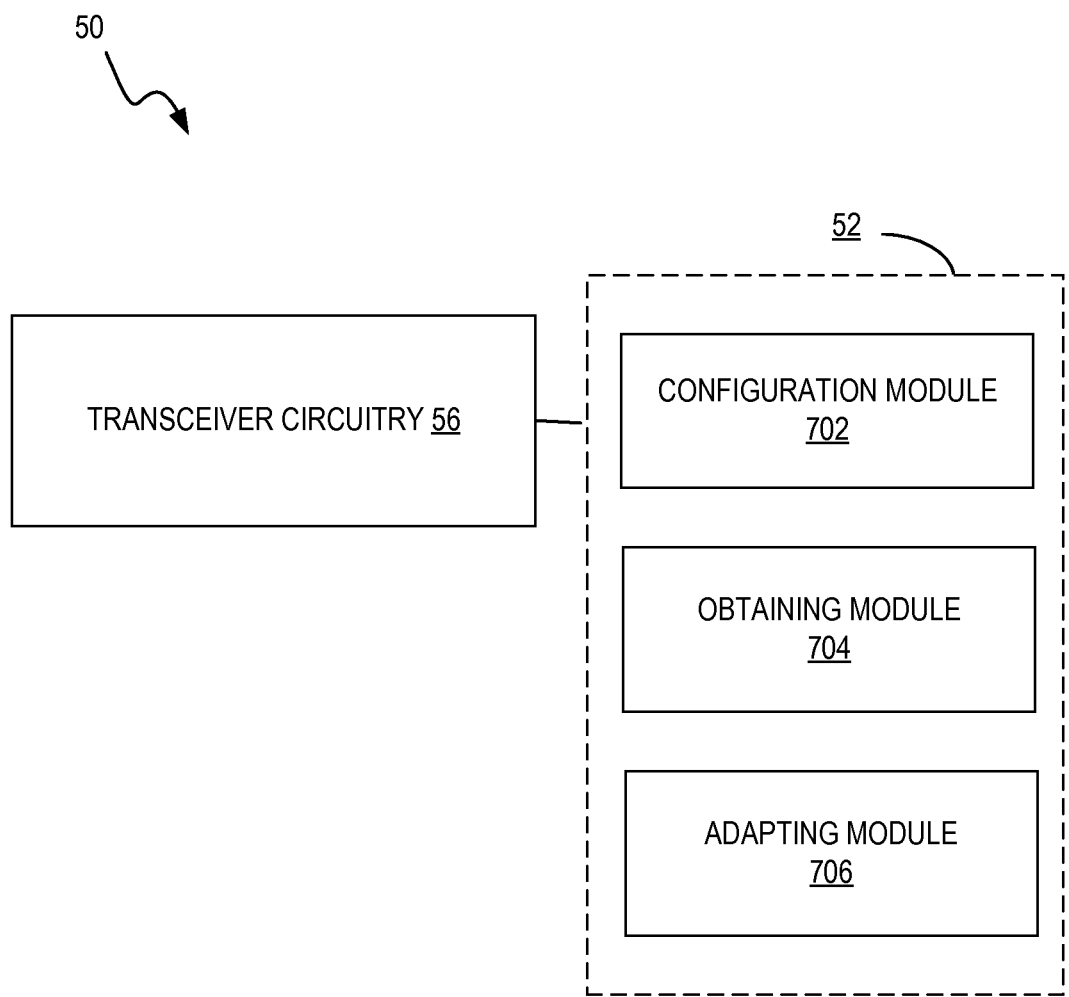
FIG. 7 illustrates a functional representation of a wireless device.

The UE 50 may also be considered to comprise one or more virtual modules, each configured to perform any step described above. An example is shown in FIG. 7. Each of the modules may comprise any combination of software and or hardware. For example, the UE 50 may comprise an obtaining or configuration module 702 for obtaining a first set of RSSI configuration parameters, comprising RSSI duration and RSSI periodicity. The UE may comprise a further obtaining module 704 for obtaining a quality metric associated with RSSI. The UE may further comprise an adapting (or determining) module 706 for adapting (or determining) one or more of: a reporting interval for at least one measurement which is to be based on RSSI samples; at least one RSSI configuration parameter (for example from the first set of RSSI configuration parameters); and UE behavior in handling (or UE processing of) the available RSSI samples, based at least on the obtained first set of RSSI configuration parameters and the quality metric. The UE 50 may further comprise a performing module for performing at least one measurement based on the adapted (or determined) configuration of the reporting interval and/or RSSI configuration parameter(s) and/or UE processing of the available RSSI samples. The UE 50 may further comprise a processing module for using the at least one measurement for operational tasks and/or a reporting module for reporting a result of the at least one measurement to another node.

Figure 6:
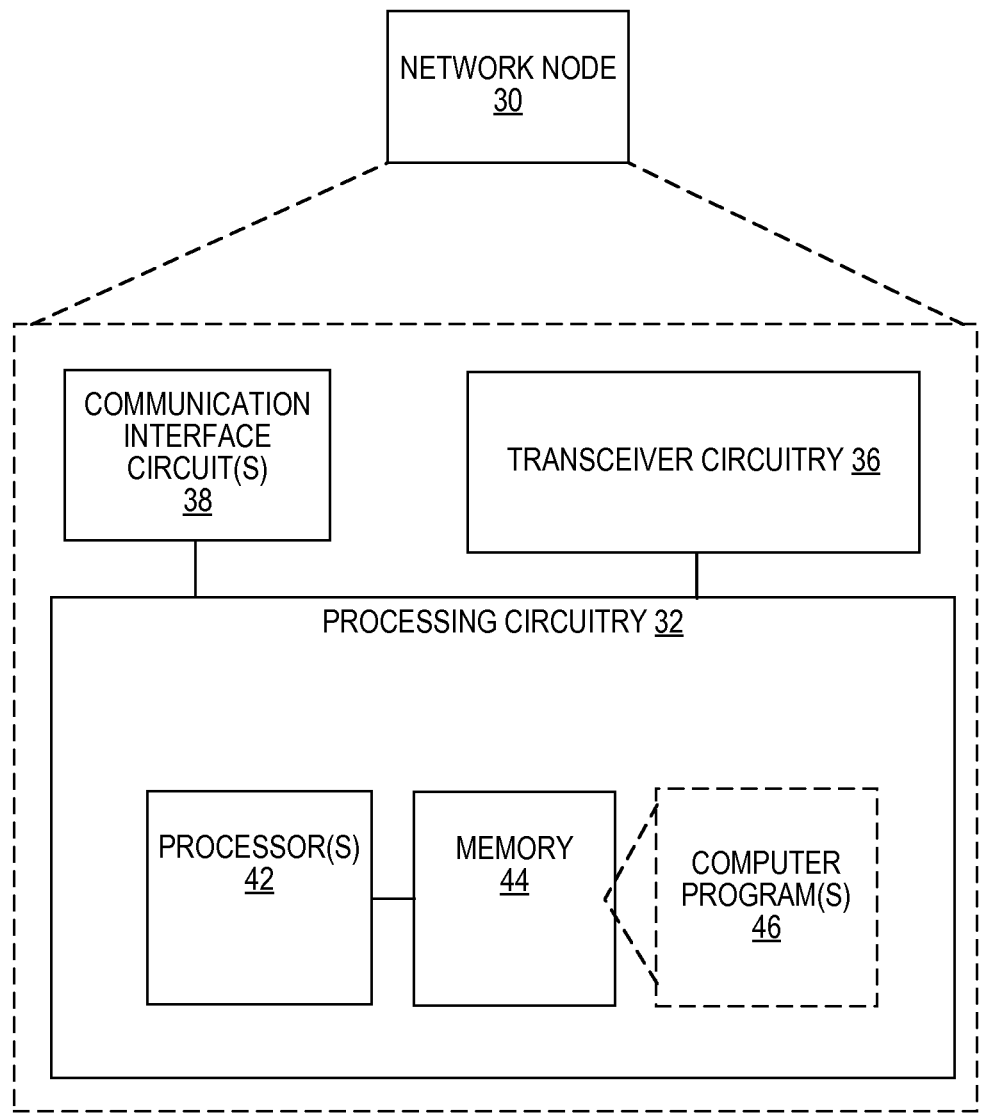
FIG. 6 is a block diagram of an example network node.

Similarly, a network node may be configured to perform any of the methods described above as suitable for a network node. For example, the network node 30 shown in FIG. 6 may comprise processing circuitry 32 configured (or operable) to perform any of the methods described above, such as method 400. The processing circuitry 32 may be operatively associated with a communication interface circuit 38 and/or transceiver circuitry 36. The processing circuitry 32 may comprise, for example, one or more digital processors 42, e.g. one or more microprocessors, microcontrollers, DSPs, FPGAs, CPLDs, ASICs or any combination thereof. The processing circuitry 32 may also include a memory 44. The memory 44 may in some embodiments comprise one or more computer programs 46.

Figure 8:
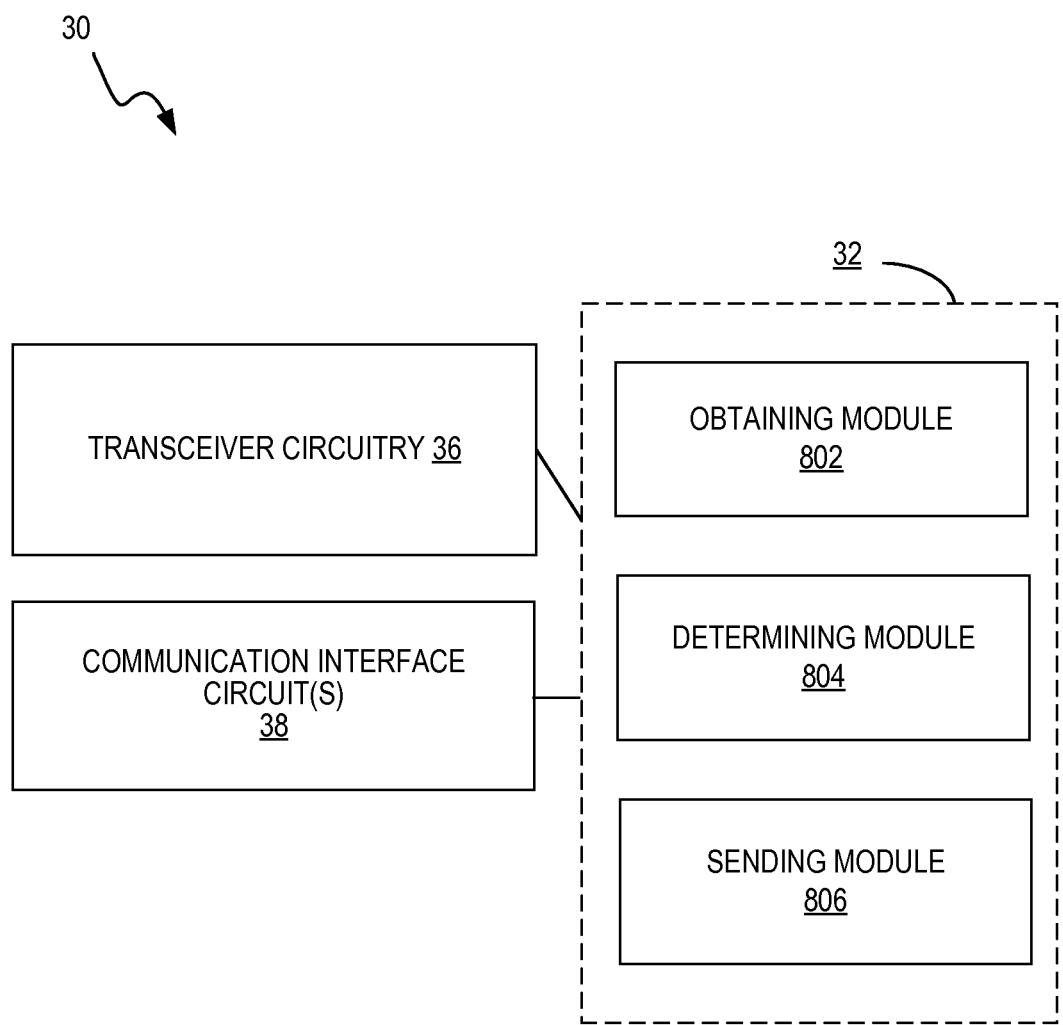
FIG. 8 shows a functional representation of a network node.

The network node 30 may also be considered to comprise one or more virtual modules, each configured to perform any step described above. An example of such an embodiment is shown in FIG. 8. Each of the modules may comprise any combination of software and or hardware. For example, the network node 30 may comprise an obtaining module 802 for obtaining a quality metric associated with RSSI. The network node 30 may further comprise a determining module 804 for determining one or more of: a reporting interval for at least one measurement which is to be based on RSSI samples; at least one RSSI configuration parameter (RSSI duration, RSSI periodicity, a time offset for the RSSI duration window). The network node 30 may further comprise a sending module 806 for sending the determined parameter to a UE.

Below is an explanation of some abbreviations used in this document.

| Abbreviation | Explanation |
| --- | --- |
| CA | Carrier Aggregation |
| CSI-RSRP | Reference symbol received power using CSI reference symbols |

-continued

| Abbreviation | Explanation |
| --- | --- |
| DRS | Discovery Signal |
| DRX | Discontinuous Reception |
| eNB | Evolved node B |
| LAA | Licence assisted access |
| LBT | Listen before talk |
| LTE | Long-Term Evolution |
| RSRP | Reference symbol received power |
| RSRQ | Reference symbol received quality |

The invention claimed is:

1. A method, in a wireless device operating in a wireless network, the method comprising:
obtaining a set of configuration parameters for Received Signal Strength Indicator (RSSI) measurements, the configuration parameters specifying a length for RSSI measurement durations in which RSSI measurement samples are obtained and an RSSI measurement periodicity for the RSSI measurement durations; and
adapting operation of the wireless device with respect to a measurement that is based on RSSI measurement samples, based on the set of configuration parameters and based on a quality requirement for the measurement that is based on RSSI measurement samples, wherein said adapting operation of the wireless device comprises postponing a use of one or more RSSI measurements from a first measurement interval for the measurement that is based on RSSI measurements to a second measurement interval for the measurement that is based on RSSI measurement samples, based on the quality requirement.

2. The method of claim 1, where said adapting comprises adapting one or more of any of the following, based on the set of configuration parameters and based on the quality requirement:
a reporting interval for the measurement that is based on RSSI measurement samples;
at least one RSSI configuration parameter from the obtained set of configuration parameters for the RSSI measurements, for performing the measurement that is based on RSSI measurement samples; and
usage of the RSSI measurement samples for performing the measurement that is based on RSSI measurement samples.

3. The method of claim 1, wherein said adapting comprises adapting a time offset to be applied to the intervals in which RSSI measurement samples are obtained, based on the set of configuration parameters and based on the quality requirement, for performing the measurement that is based on RSSI measurement samples.

4. The method of claim 3, wherein adapting the time offset comprises selecting a time offset for inter-frequency RSSI measurements, based on the quality requirement.

5. The method of claim 1, wherein said adapting comprises any one or more of any of:
adapting a triggering condition for reporting the measurement that is based on RSSI measurement samples, based on the quality requirement;
changing the length of one or more RSSI measurement durations or the RSSI measurement periodicity, for performing the measurement that is based on RSSI measurement samples, based on the quality requirement; and
discarding one or more RSSI measurement samples, based on the quality requirement.

6. The method of claim 1, wherein the quality requirement is one of any of the following:
- a minimum number of RSSI measurement samples for the measurement that is based on RSSI measurement samples;
- a minimum number of RSSI measurement samples meeting a predetermined condition, for the measurement that is based on RSSI measurement samples;
- a minimum portion of a given RSSI measurement duration that must be used for the measurement that is based on RSSI measurement samples;
- a requirement that all symbols in a given RSSI duration interval are available within the reporting interval for the measurement that is based on RSSI measurement samples; and
- a requirement that all symbols in a given RSSI duration interval within the reporting interval are used for the measurement that is based on RSSI measurement samples.

7. A wireless device adapted for operation in a wireless network, the wireless device comprising:
- a transceiver circuit;
- a processor operatively coupled to the transceiver circuit; and
- a memory circuit operatively coupled to the processor and comprising computer program instructions for execution by the processor and configured so as to cause the network node, when the computer program instructions are executed, to:
    - obtain a set of configuration parameters for Received Signal Strength Indicator (RSSI) measurements, the configuration parameters specifying a length for RSSI measurement durations in which RSSI measurement samples are obtained and an RSSI measurement periodicity for the RSSI measurement durations; and
    - adapt operation of the wireless device with respect to a measurement that is based on RSSI measurement samples, based on the set of configuration parameters and based on a quality requirement for the measurement that is based on RSSI measurement samples, wherein said adapting operation of the wireless device comprises postponing a use of one or more RSSI measurements from a first measurement interval for the measurement that is based on RSSI measurements to a second measurement interval for the measurement that is based on RSSI measurement samples, based on the quality requirement.

8. The wireless device of claim 7, wherein the wireless device is configured to adapt any one or more of any of the following, based on the set of configuration parameters and based on the quality requirement:
- a reporting interval for the measurement that is based on RSSI measurement samples,
- at least one RSSI configuration parameter from the obtained set of configuration parameters for the RSSI measurements, for performing the measurement that is based on RSSI measurement samples, and
- usage of the RSSI measurement samples for performing the measurement that is based on RSSI measurement samples.

9. The wireless device of claim 7, wherein the wireless device is configured to adapt a time offset to be applied to the intervals in which RSSI measurement samples are obtained, based on the set of configuration parameters and based on the quality requirement, for performing the measurement that is based on RSSI measurement samples.

10. The wireless device of claim 9, wherein the wireless device is configured to adapt the time offset by selecting a time offset for inter-frequency RSSI measurements, based on the quality requirement.

11. The wireless device of claim 7, wherein the wireless device is configured to perform any one or more of any of:
- adapting a triggering condition for reporting the measurement that is based on RSSI measurement samples, based on the quality requirement;
- changing the length of one or more RSSI measurement durations or the RSSI measurement periodicity, for performing the measurement that is based on RSSI measurement samples, based on the quality requirement; and
- discarding one or more RSSI measurement samples, based on the quality requirement.

12. The wireless device of claim 7, wherein the quality requirement is one of the following:
- a minimum number of RSSI measurement samples for the measurement that is based on RSSI measurement samples;
- a minimum number of RSSI measurement samples meeting a predetermined condition, for the measurement that is based on RSSI measurement samples;
- a minimum portion of a given RSSI measurement duration that must be used for the measurement that is based on RSSI measurement samples;
- a requirement that all symbols in a given RSSI duration interval are available within the reporting interval for the measurement that is based on RSSI measurement samples; and
- a requirement that all symbols in a given RSSI duration interval within the reporting interval are used for the measurement that is based on RSSI measurement samples.

13. The wireless device of claim 7, wherein the wireless device is further adapted to report a result of the measurement to a network node in the wireless communication network.

14. The wireless device of claim 7, wherein the wireless device is further adapted to send, to a network node in the wireless communication network, an indication of whether the quality requirement was satisfied, for one or more instances of the measurement that is based on RSSI measurement samples.

15. The wireless device of claim 7, wherein the measurement based on RSSI samples comprises a channel occupancy measurement.

16. A non-transitory computer-readable medium comprising, stored thereupon, a computer program product comprising program instructions for execution by a processor of a wireless device operating in a wireless network, the program instructions comprising instructions for:
- obtaining a set of configuration parameters for Received Signal Strength Indicator (RSSI) measurements, the configuration parameters specifying a length for RSSI measurement durations in which RSSI measurement samples are obtained and an RSSI measurement periodicity for the RSSI measurement durations; and
- adapting operation of the wireless device with respect to a measurement that is based on RSSI measurement samples, based on the set of configuration parameters and based on a quality requirement for the measurement that is based on RSSI measurement samples, wherein said adapting operation of the wireless device comprises postponing a use of one or more RSSI measurements from a first measurement interval for the measurement that is based on RSSI measurements to a second measurement interval for the measurement that is based on RSSI measurement samples, based on the quality requirement.

\* \* \* \* \*